United States Patent
Liao

(10) Patent No.: US 12,177,776 B2
(45) Date of Patent: Dec. 24, 2024

(54) SYSTEMS, METHODS, AND DEVICES FOR ACCESS CONTROL FOR PRIVATE SLICES IN A PLMN

(71) Applicant: APPLE INC., Cupertino, CA (US)

(72) Inventor: Ching-Yu Liao, Portland, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/327,616

(22) Filed: Jun. 1, 2023

(65) Prior Publication Data

US 2023/0319701 A1  Oct. 5, 2023

Related U.S. Application Data

(63) Continuation of application No. 17/285,421, filed as application No. PCT/US2019/056677 on Oct. 17, 2019, now Pat. No. 11,711,757.

(60) Provisional application No. 62/747,576, filed on Oct. 18, 2018.

(51) Int. Cl.
*H04W 48/18* (2009.01)
*H04W 48/02* (2009.01)
*H04W 84/04* (2009.01)

(52) U.S. Cl.
CPC .......... *H04W 48/18* (2013.01); *H04W 48/02* (2013.01); *H04W 84/042* (2013.01)

(58) Field of Classification Search
CPC .... H04W 48/18; H04W 48/02; H04W 84/042
See application file for complete search history.

(56) References Cited

U.S. PATENT DOCUMENTS

| 2015/0004924 A1 | 1/2015 | Bum et al. |
| 2017/0041854 A1 | 2/2017 | Jaehyun et al. |
| 2022/0201592 A1 | 6/2022 | Lindheimer et al. |
| 2022/0322182 A1 | 10/2022 | Lee et al. |

FOREIGN PATENT DOCUMENTS

| EP | 2940582 A1 | 11/2015 |
| JP | 2003032353 A | 1/2003 |
| KR | 1020180038002 A | 4/2018 |
| WO | 2018143631 A1 | 8/2018 |

OTHER PUBLICATIONS

3GPP TR 23.734 v0.2.0 (Sep. 2018). 3rd Generation Partnership Project; Technical Specification Group Services and System Aspects; Study on 5GS Enhanced support of Vertical and LAN Services (Release 16) (Year: 2018).*
U.S. Appl. No. 17/285,421, Notice of Allowance, Mar. 9, 2023, 17 pages.
PCT/US2019/056677, International Search Report and Written Opinion, Feb. 5, 2020 00:00:00.0, 15 pages.

* cited by examiner

*Primary Examiner* — Wayne H Cai
(74) *Attorney, Agent, or Firm* — Dorsey & Whitney LLP

(57) ABSTRACT

Systems and methods provide user equipment (UE) access parameters for access control when, for example, the UE is accessing a non-public network, the UE is accessing a private slice in a public land mobile network (PLMN), the UE is accessing a non-public network for PLMN service, and/or the UE is accessing a private slice in a PLMN for a non-public network service.

10 Claims, 8 Drawing Sheets

SYSTEMS, METHODS, AND DEVICES FOR ACCESS CONTROL FOR PRIVATE SLICES IN A PLMN

CROSS-REFERENCE TO RELATED APPLICATION(S)

This application is a continuation of U.S. application Ser. No. 17/285,421, filed Apr. 14, 2021, which is a national stage application under 35 U.S.C. § 371 of International Patent Application No. PCT/US2019/056677, filed Oct. 17, 2019, which claims the benefit of U.S. Provisional Application No. 62/747,576, filed Oct. 18, 2018, each of which is hereby incorporated by reference herein in its entirety.

TECHNICAL BACKGROUND

This application relates generally to wireless communication systems, and more specifically to access control.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB), and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Figure 1:
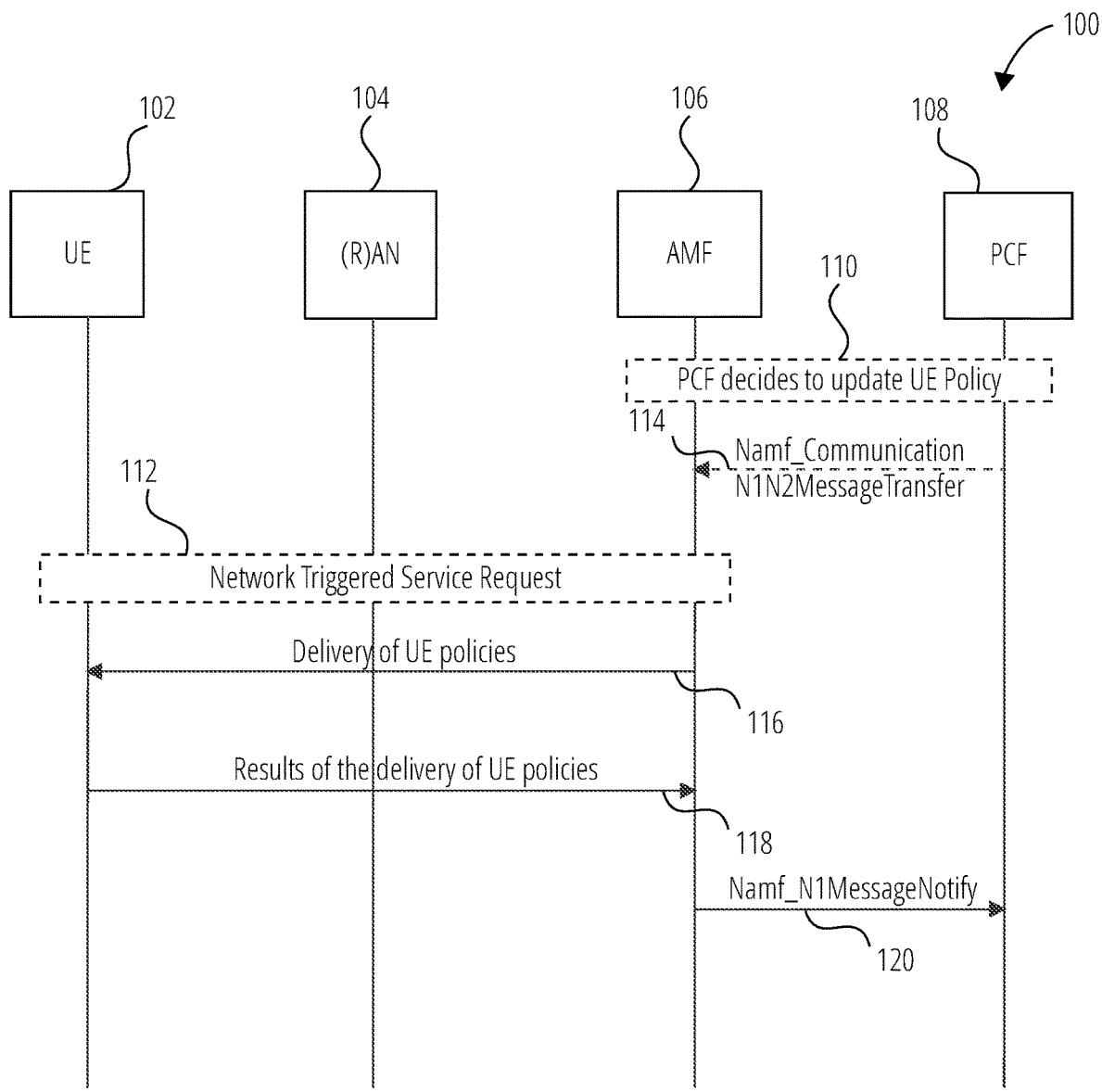
FIG. 1 illustrates a UE configuration update procedure in accordance with one embodiment.

Given the multitude of use cases for new verticals and services, each network operator, based on its business model, may deploy a network serving only a subset of vertical industries and services. However, this should not prevent an end-user from accessing all new services and capabilities that will be accessible via 5G systems. To provide a better user experience for their subscribers with UEs capable of simultaneous network access, network operators may contemplate a variety of sharing business models and partnerships with other network and service providers to enable mobile subscribers to access services via multiple networks simultaneously and with minimum interruption.

Vertical automation systems are locally distributed and are typically served by wired and wireless communication networks of different types and with different characteristics. If the operation of the system or one of its sub-processes does not work properly, there is a need for quickly finding and eliminating the related error or fault in order to avoid significant operation and thus financial losses. To that end, automation devices and applications implement diagnosis and error-analysis algorithms, as well as predictive maintenance features. Based on the service requirements for the study of communication of automation in the vertical domain, 3GPP has started an architecture study on 5G system (5GS) enhanced support of Vertical and LAN services in 3GPP TR 23.734.

In addition, a study of the service requirements for Feasibility Study on Business Role Models for Network Slicing in 3GPP TR 22.830 has been further elaborated, in which new business role models is supported in 3GPP 5G systems by allowing 3rd parties more control of system capabilities.

5G supports new business role models relevant for 3GPP systems. In previous generations, business role models centered on two key types of relationships: those between Mobile Network Operators (MNOs) and their subscribers and those between MNOs (e.g., roaming, RAN sharing). To a limited extent, relationships between MNOs and 3rd party application providers have also been supported in the form of application programming interfaces (APIs) (e.g., by the service capability exposure function (SCEF) interface) allowing access to specific network capabilities, such as those used by 3rd party applications to access UE location information. 5G opens the door to new business role models for 3rd parties, allowing 3rd parties more control of system capabilities. The study in 3GPP TR 22.830 considers these new business roles and how 3GPP can best support the trust relationships between MNOs and 3rd parties resulting from these new business role models.

In 5G, at least three role models are envisaged for stakeholders: an MNO owns and manages both the access and core network (model 1); an MNO owns and manages the core network, the access network is shared among multiple operators (i.e., RAN sharing) (model 2); and only part of the network is owned and/or managed by an MNO, with other parts being owned and/or managed by a 3rd party (model 3). The first two are those found in previous generations of 3GPP systems, where MNOs are operating public land mobile networks (PLMNs). In 5G it is expected that a 3rd party can take on the role of an MNO, however, in this case the 3rd party would operate its own network. From a 3GPP perspective, the first two stakeholder role models are the same whether an MNO or vertical 3rd party is involved. Basic support for the 3rd party stakeholder role model was provided in previous generations via APIs which allowed minimal access to or management of network capabilities. In contrast, the 5G enhancements will allow greater control and ownership by the 3rd party, which will require increased trust between the MNO and 3rd party. These new trust relationships become even more impactful when network slicing is considered, particularly where the 3rd party is authorized to control some aspects of network slices that are owned by the MNO.

With the introduction of network slicing, the third stakeholder role model above warrants additional investigation to understand the trust relationships between MNOs and 3rd parties. There are four potential business relationship models impacting the trust relationships for the third stakeholder role model (i.e., model 3). In a Model 3a, the MNO provides the virtual/physical infrastructure and V/NFs and a third party uses the functionality provided by the MNO. In a Model 3b, the MNO provides the virtual/physical infrastructure and V/NFs; a third party manages some V/NFs via APIs exposed by the MNO. In a Model 3c, the MNO provides virtual/physical infrastructure and a third party provides some of the V/NFs. In a Model 3d, a 3rd party provides and manages some of the virtual/physical infrastructure and V/NFs. These modes are summarized in Table 1.

However, these models still require ensuring appropriate levels of security are maintained for any communications.

In four potential business relationship models, three management role models can be considered for models 3c and 3d: the MNO manages all virtual/physical infrastructure and all V/NFs including third party's ones; the third party manages its own virtual/physical infrastructure and/or its own V/NFs, and the MNO manages the others; and the third party manages virtual/physical infrastructure and/or V/NFs including its own virtual/physical infrastructure and/or V/NFs and some MNO's virtual/physical infrastructure and/or V/NFs, and the MNO manages the others.

From the 3rd party perspective, the management role models 2 and 3 support the third party management function and provide extended management for the MNO to coordinate with the third party management. The third party may use suitable APIs provided by the MNO to directly manage the V/NFs as well as the infrastructure resources so that it can properly handle when their business requirements are changed.

The study in 3GPP TR 22.830 also provides the following potential service requirements have been agreed to be included in TS: the 5G system supports a mechanism to limit a UE to only receiving service from an authorized slice; and the 5G system supports a mechanism to prevent a UE from trying to access a radio resource dedicated to a specific private slice.

Even though existing Unified Access Control mechanism can support access control for a particular network slice, there are still open issues on how the 5GS provides a mechanism to support network slice based access control for a UE in above-mentioned business role models, especially for the case that the private slice in PLMN is operated by a third party.

The present disclosure provides embodiments to resolve the above-mentioned open issues for the access control in different business role models. Certain embodiments discussed herein include a set of UE configuration parameters for access control in the following scenarios: the UE is

TABLE 1

Business Relationship Models

| | | | Model 3a | Model 3b | Model 3c | Model 3d |
|---|---|---|---|---|---|---|
| Virtual/physical Infrastructure (3GPP architecture) | Core | physical | MNO | MNO | MNO | MNO and 3rdparty |
| | | virtual | MNO | MNO | MNO | MNO and 3rdparty |
| | RAN | physical | MNO | MNO | MNO | MNO and 3rdparty |
| | | virtual | MNO | MNO | MNO | MNO and 3rdparty |
| Virtual Network Functions (Applications/Servers) | Provider | | MNO | MNO | MNO and 3rdparty | MNO and 3rdparty |
| | Manager | | MNO | MNO and 3rdparty | MNO and 3rdparty | MNO and 3rdparty |

Of these models, 3a and 3b have been addressed by the requirements in place in 3GPP TS 22.261. Provision has been made to ensure appropriate APIs and management functions to support this extended 3rd party access and control of capabilities provided by the MNO, and to do so in a secure manner. Within these two models, the third party has increasing control over the network capabilities that support its service. However, this control is limited to what is allowed by the MNO through the provided APIs.

Models 3c and 3d provide extended control for the third party on the network capabilities supporting its service.

accessing non-public network; the UE is accessing private slice in a PLMN; the UE is accessing non-public network for a PLMN service; and/or the UE is accessing private slice in a PLMN for a non-public network service. The term "non-public network" refers to a network that is intended for non-public use, such as a network deployed in a factory or enterprise.

A 5GS Unified Access Control (UAC) mechanism has been supported as in 3GPP TS 22.261 clause 6.22 and 3GPP TS 38.304 clause 5.3.2. To determine the access identities and the access category for a request, the non-access stratum (NAS) checks the reason for access, types of service requested and profile of the UE including UE configurations, against a set of access identities and access categories defined in 3GPP TS 22.261, namely: (a) a set of standardized access identities; (b) a set of standardized access categories; and (c) a set of operator-defined access categories, if available. However, the existing UAC mechanism is for PLMNs, i.e. non-public network is not considered yet, and assumed that only MNOs provides communication services (as CSP) to UEs.

A Vertical_LAN study in 3GPP TR 23.734, solution 3, proposes an access control mechanism. The access class information may be stored in a Universal Subscriber Identity Module (USIM) or a part of the configuration of the non-public network profile, the UE may be configured with the access class information corresponding to the configured NPN-ID (non-public network ID). For the access control of the non-public network, the solution is based on the following principles. A RAN node may broadcast access class barring information for the UEs allowed to access the non-public network, and the UE(s) determines if it is allowed to access a non-public network based on the configured access class per NPN ID in the non-public network profile. However, the access control for NPN is not considered in different business role models, including the case the access control for private slice in PLMN.

A Vertical_LAN study in 3GPP TR 23.734, solution 5, proposes an access control mechanism for the case of Standalone Non-public network. In an Option 1, the non-public network assigns a special access identity (as part of UAC framework) to its UE(s). Thus, UE(s) assigned with regular access class (allowed in public PLMNs) that are not authorized to access non-public network are not allowed to even initiate random access channel (RACH) access towards the non-public network. In an Option 2, the non-public network bars access to UE(s) not configured with its network identifier by default. A RAN may broadcast that access is barred for UE(s) not configured with its certain network identifier. However, the access control for NPN is not considered in different business role models, including the case the access control for private slice in PLMN.

Certain prior approaches discussed above do not provide network slice based access control when considering different business role models with private slice in PLMN. The present disclosure provides embodiments in support of access control in different deployment options when enabling services in PLMN domain or vertical domain for the 5GS UE capable of non-public network. The present disclosure includes various embodiments. Embodiment 1 is for access control mechanism in standalone non-public network architecture. Embodiment 2 provides access control for non-standalone non-public network operated as a private slice in PLMN. Embodiment 3 includes an API approach. Embodiment 4 provides coordination between a standalone non-public network and non-standalone non-public network operated as a private slice in PLMN for access control. Without these and other embodiments discussed herein, the 5GS cannot provide access control to authorized private slice for a UE in different business role models.

Access Control Parameters Provisioning

In certain embodiments, a PLMN provides parameters to a third party network or vice versa. The parameters may be provided from a network entity, e.g., a PCF, in the PLMN via a network exposure function (NEF) or PCF in the third party network. In the latter case when a PCF is used, for example, the PLMN and the third party network may have service agreements with one another and regard each other as a trusted network.

In certain embodiments, access control parameters are provisioned to a UE in a UE configuration update procedure initiated by an AMF or PCF. For example, FIG. 1 illustrates an example UE configuration update procedure 100 according to one embodiment. The UE configuration update procedure 100 includes cooperation between a UE 102, a RAN or other access network (shown as (R)AN 104), an access and mobility management function (shown as AMF 106), and a policy control function (shown as PCF 108). The UE configuration update procedure 100 is initiated when the PCF 108 decides to update UE policy 110. The PCF 108 may decide to update the UE 102 access selection and protocol data unit (PDU) session selection related policy information (i.e., UE policy) in the UE configuration. In the non-roaming case, the visited PCF (V-PCF) is not involved and the role of the home PCF (H-PCF) is performed by the PCF. For the roaming scenarios, the V-PCF interacts with the AMF 106 and the H-PCF interacts with the V-PCF. The PCF 108 may decide to update the UE policy procedures based on triggering conditions such as an initial registration, registration with 5G system (5GS) when the UE moves from evolved packet system (EPS) to 5GS, or updates UE policy.

For example, for the case of initial registration and registration with 5GS when the UE 102 moves from EPS to 5GS, the PCF 108 compares the list of public service identifiers (PSIs) included in the UE access selection and PDU session selection related policy information in Npcf_UEPolicyControl_Create request and determines whether UE access selection and PDU session selection related policy information are to be updated and provided to the UE 102 via the AMF 106 using a DL NAS TRANSPORT message. As another example, for the network triggered UE policy update case (e.g., the change of UE location, the change of subscribed single network slice selection assistance information (S-NSSAI) as described in clause 6.1.2.2.2 of 3GPP TS 23.503), the PCF 108 checks the latest list of PSIs to decide which UE access selection and/or PDU session selection related policies to send to the UE 102.

The PCF 108 may check if the size of the resulting UE access selection and PDU session selection related policy information exceeds a predefined limit. If the size is under the limit, then UE access selection and PDU session selection related policy information is included in a single Namf_Communication_N1N2MessageTransfer service operation 114 as described below. If the size exceeds the predefined limit, the PCF 108 splits the UE access selection and PDU session selection related policy information in smaller, logically independent UE access selection and PDU session selection related policy information ensuring the size of each is under the predefined limit. Each UE access selection and PDU session selection related policy information may then be sent in a separate Namf_Communication_N1N2MessageTransfer service operation 114 as described below.

The NAS messages from the AMF 106 to the UE 102 may not exceed the maximum size limit allowed in NG-RAN (PDCP layer), so the predefined size limit in PCF 108 may be related to that limitation. The mechanism used to split the UE access selection and PDU session selection related policy information is described in 3GPP TS 29.507.

The PCF 108 invokes the Namf_Communication_N1N2MessageTransfer service operation 114 provided by the AMF 106. The message may include SUPI and a UE policy container.

In a network triggered service request 112, if the UE 102 is registered and reachable by the AMF 106 in either 3GPP access or non-3GPP access, the AMF 106 transfers transparently the UE policy container to the UE 102 via the registered and reachable access. If the UE 102 is registered in both 3GPP and non-3GPP accesses and reachable on both access and served by the same AMF 106, the AMF 106 transfers transparently the UE policy container to the UE 102 via one of the accesses based on the AMF local policy. If the UE 102 is not reachable by AMF over both 3GPP access and non-3GPP access, the AMF 106 reports to the PCF 108 that the UE policy container could not be delivered to the UE 102 using Namf_Communication_N1N2TransferFailureNotification. If the AMF 106 decides to transfer transparently the UE policy container to the UE 102 via 3GPP access, e.g. the UE 102 is registered and reachable by AMF in 3GPP access only, or if the UE 102 is registered and reachable by AMF in both 3GPP and non-3GPP accesses served by the same AMF and the AMF 106 decides to transfer transparently the UE policy container to the UE 102 via 3GPP access based on local policy, and the UE 102 is in CM-IDLE and reachable by AMF in 3GPP access, the AMF 106 starts the paging procedure by sending a paging message. Upon reception of paging request, the UE 102 may initiate a UE triggered service request procedure.

In a delivery 116 of UE policies, if the UE 102 is in CM-CONNECTED over 3GPP access or non-3GPP access, the AMF 106 transfers transparently the UE policy container (UE access selection and PDU session selection related policy information) received from the PCF 108 to the UE 102. The UE policy container may include the list of policy sections as described in 3GPP TS 23.503. The UE 102 updates the UE policy provided by the PCF 108 and sends the results 118 of the delivery of UE policies to the AMF 106.

If the AMF 106 received the UE policy container and the PCF 108 subscribed to be notified of the reception of the UE policy container then the AMF 106 forwards the response of the UE 102 to the PCF 108 using a Namf_N1MessageNotify operation 120. The PCF 108 maintains the latest list of PSIs delivered to the UE 102 and updates the latest list of PSIs in the UDR by invoking Nudr_DM_Update (SUPI, Policy Data, Policy Set Entry, updated PSI data) service operation.

Operator-Defined Access Category Definitions

In certain embodiments, operator-defined access category definitions may be signaled to the UE using NAS signaling. Operator-defined access category definitions may include some or all of the following parameters: (a) a precedence value that indicates in which order the UE evaluates the operator-defined category definition for a match; (b) an operator-defined access category number, i.e. access category number in the 32-63 range that uniquely identifies the access category in the PLMN in which the access categories are being sent to the UE; (c) one or more access category criteria type and associated access category criteria type values, wherein the access category criteria type can be set to one of a data network name (DNN), a 5G quality of service (QoS) indicator (5QI), an operating system (OS) identifier (ID) and OS application (app) ID of an application triggering the access attempt, or an S-NSSAI; and (d) optionally, a standardized access category. The standardized access category may be used in combination with the access identities of the UE to determine the radio resource control (RRC) establishment cause.

Figure 2:
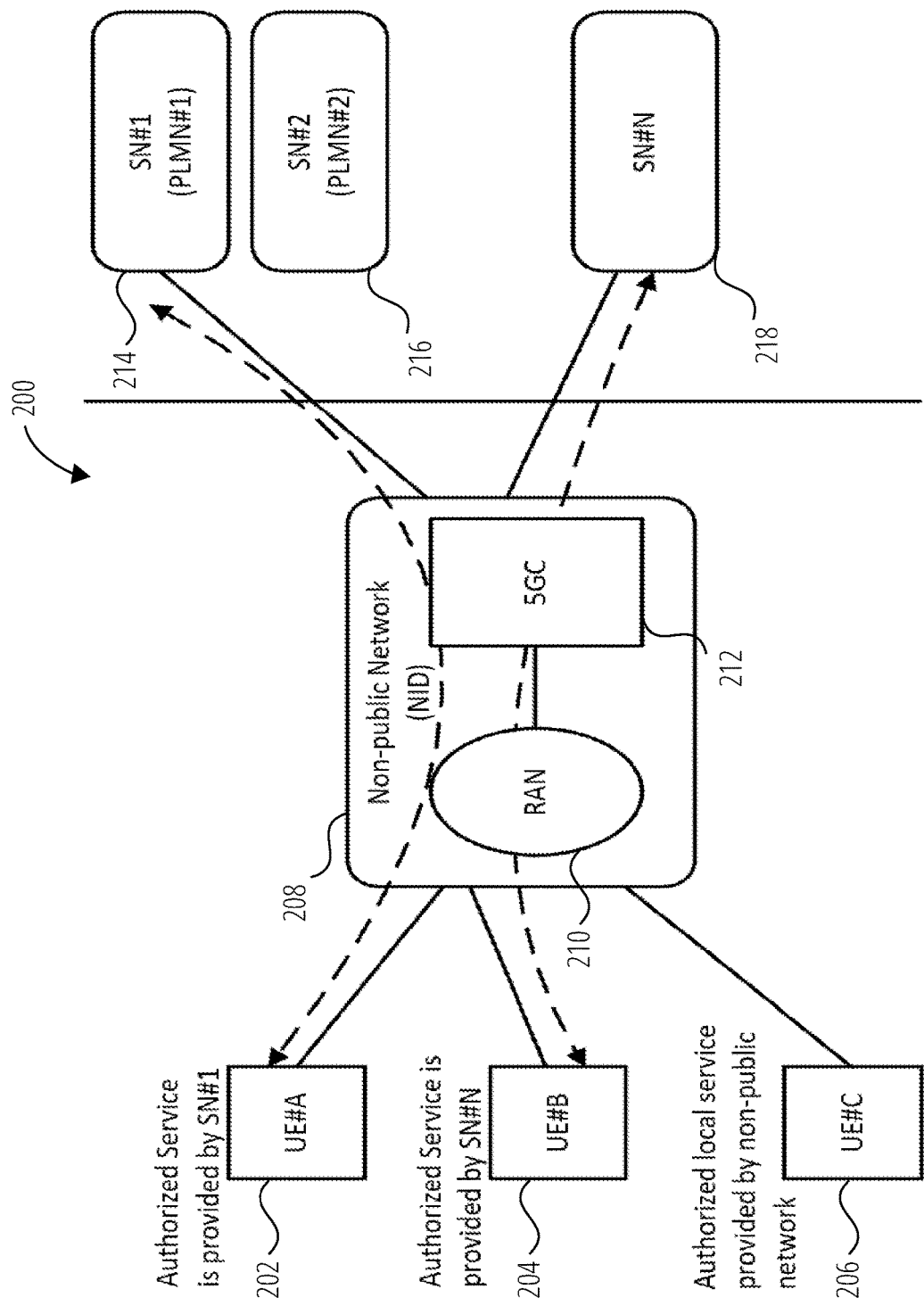
FIG. 2 illustrates an architecture in accordance with one embodiment.

Example Embodiment 1: Access Control Mechanism in Standalone Non-Public Network Architecture FIG. 2 illustrates a non-public network architecture 200 according to one embodiment. A non-public network may support services provided by one or more service network (SN) providers (also referred to herein as service providers), which can include MNOs, or third-party service provider. FIG. 2 is a diagram showing example UE 202 (UE #A), UE 204 (UE #B), and UE 206 (UE #C) connected to a non-public network (NPN) (shown as NPN 208) in accordance with some embodiments. In particular, FIG. 2 shows an example NPN and various use cases, such as where the NPN 208 is a self-contained network (e.g., for UE 206) or the case where the NPN 208 provides interaction with external service networks (e.g., for UE 202 and UE 204). In the example shown, the UEs may access local/non-public network services (e.g., the Internet) via the NPN 208, or may access external services (e.g., through service network 214, service network 216, service network 218) via the NPN 208. The service network 214 (SN #1 or PLMN #1), service network 216 (SN #2 or PLMN #2), and 218 (SN #N) may be third-party networks, and in some cases, may be public land mobile networks (PLMNs) that provide mobile cellular services according to the 3GPP TR 21.905.

In this example, the UE 202 (UE #A), the UE 204 (UE #B), and the UE 206 (UE #C) are registered to the NPN 208 identified by a non-public network ID (NID), which may also be referred to as an NPN ID. A service provider of the service network 214 (represented by SN #1 or PLMN #1), which is an MNO, provides the authorized service for the UE 202 (UE #A) through a RAN node 210 and the 5GC 212. A service provider of the service network 218 (represented by SN #N), which is a third-party service provider, provides the authorized service for the UE 204 (UE #B) through the RAN node 210 and the 5GC 212. The UE 206 (UE #C) is connected to a standalone non-public network identified by the NID. The standalone non-public network provides local services to the UEs registered to the non-public network, for example, in a factory or enterprise. For non-public network identification, according to one embodiment, the network identification of the NPN 208 may be able to support external services or local services and may have the same format of the network identification, which is defined as the NID. The NID of the NPN 208 may be able to indicate the support of external service networks (e.g., SN #1, . . . , SN #N) or local service (e.g., as a self-contained private network).

For access control, according to certain embodiments, the RAN node 210 in the NPN 208 broadcasts access control information in system information block 1 (SIB1).

Example Embodiment 1.1: Using UAC (Unified Access Control)

In the standalone non-public network architecture, according to one embodiment, the operator's defined access category is broadcasted by the RAN node to bar specific access attempts from a UE configured with the indicated access baring parameters.

The UE configuration may be stored in the non-public network profile that includes an operator defined access category definition in which access category type can include the following information: NPN-ID or list of NPN-IDs; S-NSSAI or list of S-NSSAIs; service provider identifier (SP-ID) or list of SP-IDs, in which the SP-ID comprises a PLMN-ID if using PLMN service. The RAN node may indicate any combination of above three parameters as access baring parameters in access category type to bar the access attempt from the UE configured with the same indicated combination.

Example Embodiment 2: Access Control for Non-Standalone Non-Public Network Operated as a Private Slice in PLMN For a private slice in a PLMN, Table 2 shows the relationships between communication service provider (CSP) (as a network slice indicated as CSP-NS, or as a service operator indicated as CSP-UE to a UE) and corresponding communication service consumer (CSC) (e.g., CSC-NS and CSC-UE). Table 2 shows the models considered in operating private slice in a PLMN, which is extended from the business relationship models shown in Table 1.

TABLE 2

Business models based on relationship of the CSP/CS

| Case | CSP-NS | CSC-NS | CSP-UE (infra-structure) | |
|---|---|---|---|---|
| 1 | MNO (RAN/CN) | 3$^{rd}$ Party (VNF, SB-info) | MNO | Model 3a |
| 2 | MNO (RAN/CN) | 3$^{rd}$ Party (VNF, SB-manage) | MNO | Model 3b |
| 3 | 3$^{rd}$ party (VNF-in CN) | MNO (RAN/CN) | MNO | Model 3c |
| 4 | 3$^{rd}$ party (RAN/CN) | MNO (VNF in CN) | 3$^{rd}$ Party + MNO; | Model 3d |
| 5 | MNO (VNF, SB-manage) | 3rd party (RAN/CN) | 3$^{rd}$ Party + MNO; | Model 3e |

For Model 3a, the third party may use private slice in PLMN operated by MNO. In this case, the third party can retrieve the PLMN information via APIs provided by the MNO in the interface between the virtual network function (application/service) and the 3GPP infrastructure.

For Model 3b, the third party may manage a private slice in PLMN operated by MNO. In this case, the third party can retrieve the PLMN information and provide information to manage the radio/network resources in the private slice via APIs provided by the MNO in the interface between the virtual network function (application/service) and the 3GPP infrastructure.

For Model 3c, the third party may provide a virtual network slice, being trusted and served as an application/server, in the PLMN, in which the third party is a CSP of a network slice (CSP-NS) and the MNO is CSC (indicated as CSC-NS). Also, MNO uses the private slice to provide services to its subscribers, i.e. MNO is CSP for the UE (indicated as CSP-UE). In this model, the private slice operated by the third party is trusted by the MNO based on the agreements between two parties.

For Model 3d, the third party deploys RAN and/or core network (CN) infrastructure which is served as a private slice in the PLMN, in which the third party is a CSP of a network slice (CSP-NS) and the MNO is CSC (indicated as CSC-NS). Based on agreements between the MNO and the third party, it is possible that MNO and the third party both can use the private slice to provide services to its subscribers, i.e. MNO is CSP for the UE (indicated as CSP-UE) in its PLMN and the third party is CSP for the UE (also CSP-UE) authorized for non-public network.

For Model 3e, the third party deploys a standalone RAN/CN infrastructure which is served as a private slice as the non-public network, in which the third party is a CSC of a network slice (CSC-NS) and the MNO is CSP (indicated as CSP-NS) for providing spectrums used for PLMN service as well as network configuration services to the third party. Based on agreements between the MNO and the third party, it is possible that the MNO and the third party both can use the private slice to provide services to its subscribers, i.e. MNO is CSP for the UE (indicated as CSP-UE) in its PLMN and the third party is CSP for the UE (also CSP-UE) authorized for non-public network.

Models 3d and 3e are feasible cases for network sharing, especially RAN sharing, in which the RAN node can be shared by MNO(s) and one or more third party. If the private slice is used by the MNO to serve its UE, the MNO can retrieve the private slice information and provide information to manage the radio/network resources in the private slice via APIs provided by the third party in the interface between the virtual network function (application/service) and the 3GPP infrastructure.

Furthermore, for model 3d and 3e, the private slice of the RAN infrastructure provided by the third party can be regarded as a private slice in PLMN is due to the fact that the MNO or the third party uses the private slice for providing PLMN service to its UEs. Otherwise, the private slice is the network slice in non-public network providing non-public network service operated by a third party.

Example Embodiment 2.1

Following example embodiment 2, the private slices in a PLMN may be operated as a non-public network identified as an NPN-ID. For each NPN-ID, there can be one or more private slice, identified as S-NSSAI, associated to it. When an S-NSSAI is used as a private slice, the S-NSSAI may include additional information to indicate its private usage.

Example Embodiment 2.2: Access Control for Model 3c

Following example embodiment 2.1, for models 3a, 3b, and 3c, the MNO as a CSP for its UE as CSC provisions the following parameters for its PLMN to the UEs using a UE configuration update procedure: an NPN-ID or a list of NPN-IDs, wherein the authorized non-public network ID for using private slice in the PLMN; a private slice S-NSSAI or a list of private slice S-NSSAIs per NPN-ID, wherein the authorized private slice to be used as a Non-public network identified as an NPN-ID; and/or an operator defined access category definition per S-NSSAI per NPN-ID including at least one access category criteria type comprising an S-NSSAI (or list of S-NSSAIs) and an NPN-ID. The UAC related configuration parameters can be provided via the UE configuration update procedure (rather than a mobility and periodic registration update).

In certain such embodiments, the UE configured with private slice authorization can use the non-public network service in PLMN in terms of private slice identified as S-NSSAI, and the RAN node in the private slice in PLMN can broadcast access baring information.

For example, the RAN node may broadcast an operator's defined access category definition that includes an access category criteria type with private slice S-NSSAI for baring access from a UE configured with non-public network authorization for any NPN-ID and the access category associated with the authorized S-NSSAI. The UE configured with the access category associated with the authorized S-NSSAI is barred from accessing the network (irrespective to any one of authorized NPN-ID). The UE that is not configured with private slice authorization is not impacted according to certain embodiments.

In another example, the RAN node may broadcast an operator's defined access category definition that includes an access category criteria type with private slice S-NSSAI #1 and S-NSSAI #2 and NPN-ID for baring access from a UE configured with non-public network authorization for NPN-ID and the authorized S-NSSAI #1 and 5-NSSAI #2. The UE configured with the access category associated with the indicated S-NSSAI #1 and S-NSSAI #2 and NPN-ID is barred from accessing the network. The UE that is not configured with private slice authorization for the NPN-ID is not impacted according to certain embodiments.

Example Embodiment 2.3: Access Control for Model 3d (Third Party as CSP for CSC-UE)

Following example embodiment 2.1, certain embodiments provide access control for model 3d, and model 3e such that the third party deploys RAN/CN infrastructure as CSP for the network slice in a PLMN operated by MNO as CSC, and the third party may provide network slice service to one or more PLMNs, i.e. the network sharing model.

In certain embodiments, the third party also serves as a CSP for its UE as CSC provisions the following parameters in a non-public network profile using the generic UE configuration update procedure: a PLMN-ID or list of PLMN-IDs (corresponding to the PLMN(s) that a private slice and NPN-ID is associated with); an NPN-ID (an authorized non-public network ID for using private slice in the indicated PLMN-ID); a private slice S-NSSAI or a list of private slice S-NSSAIs per PLMN-ID (indicating the authorized private slice(s) in the indicated PLMN-ID which is operated as a non-public network); and/or an operator defined access category definition. The operator defined access category definition may include at least one of the following access category criteria type: S-NSSAI or list of S-NSSAIs per PLMN-ID; PLMN-ID or list of PLMN-ID; and/or NPN-ID or list of NPN-IDs per PLMN-ID. The UAC related configuration parameters can be provided via the UE configuration update procedure (rather than a mobility and periodic registration update).

The UE may be configured with private slice authorization associated to a PLMN-ID in a non-public network profile can use the Non-public network service in a PLMN in terms of private slice identified as S-NSSAI. The RAN node in the private slice in a PLMN may broadcast access baring information.

For example, the RAN node may broadcast an access category that includes an access criteria type with private slice S-NSSAI for baring access from a UE configured with access category criteria type associated with the authorized S-NSSAI for any PLMN-IDs and any NPN-IDs. A UE configured with the access category associated with the authorized S-NSSAI for any PLMN-ID is barred from accessing the Non-public network. A UE that is not configured non-public network profile, i.e. is not authorized for using non-public network service, or is not configured with private slice authorization in non-public network profile is not impacted according to certain embodiments.

In another example, a RAN node may broadcast an access category that includes an access criteria type with private slice S-NSSAI and associated PLMN-ID(s) for baring access from a UE configured with the access category criteria type associated with the authorized S-NSSAI and PLMN-ID(s) for any NPN-IDs. A UE configured with the access category associated with the authorized S-NSSAI and PLMN-ID(s) is barred from accessing the network. A UE that is not configured a non-public network profile, i.e. is not authorized for using non-public network service, or is not configured with private slice authorization in non-public network profile is not impacted according to certain embodiments.

In another embodiment, a RAN node may broadcast an access category that includes an access criteria type with private slice S-NSSAI #1, S-NSSAI #2, PLMN-ID, and NPN-ID for baring access from a UE configured with the access category criteria type associated with the authorized S-NSSAI in indicated non-public network identified as an NPN-ID. A UE configured with the access category associated with the indicated S-NSSAI #1 and S-NSSAI #2 in indicated PLMN-ID for the non-public network identified as an NPN-ID is barred from accessing the network. A UE which is not configured non-public network profile, i.e. is not authorized for using non-public network service, or is not configured with private slice authorization in non-public network profile is not impacted according to certain embodiments.

Example Embodiment 2.4: Access Control for Model 3d (MNO as CSP for CSC-UE)

Following embodiment 2.3, except for the third party, the MNO may also serve as a CSP for its UE as CSC provisions the following parameters in the UE configuration for the PLMN using a UE configuration update procedure. In this case, example embodiment 2.2 may be applied. The UAC related configuration parameters can be provided via the UE configuration update procedure (rather than a mobility and periodic registration update).

Example Embodiment 3: API

Following embodiment 2.3 or embodiment 2.4, certain embodiments use one or more API for model 3d and 3e such that the third party deploys RAN/CN infrastructure. The third party may provide an API over the interface between the virtual network function provided by the MNO and virtual network function provided by the third party. In one embodiment, the third party provides APIs that are used by the MNO to provide the MNO's S-NSSAI configuration and operator's defined access category. In one embodiment, the third party provides APIs that are used by the third party to request S-NSSAI configuration and the operator's defined access category from the MNO. In one embodiment, the third party provides APIs that are used by the MNO to trigger UE configuration procedure for configuring the MNO's UE accessing to the private slice in the PLMN. In one embodiment, the third party provides APIs that are used by the MNO to provide spectrum information and corresponding radio network configuration information for the third to configuring its RAN/CN infrastructure. In one embodiment, the third party provides APIs to provide the following information to the MNO: radio resource information for network slices associated to the PLMN of the MNO; third party operator defined access category definition for the private slice in its Non-public network; and/or the authorization and request for the MNO to manage access control configuration for the RAN node deployed by the third party.

For example, when the MNO is served as a CSP for its UE using private slice provided by a third party that deploy RAN/CN infrastructure, the UE configuration may provide information regarding to access category definition. The MNO provides the applicable operator's defined access category definition to the third party.

Example Embodiment 4: Access Control Parameters Coordination Between Standalone Non-Public Network and Non-Standalone Non-Public Network Operated as a Private Slice in PLMN In certain embodiments, when the UE is configured with non-public network profile, it may be authorized to register in a non-public network. The UE authorized to use a non-public network and PLMN may access a private slice in a PLMN to register its non-public network. This can be supported when the UE is in the PLMN coverage but is not in the coverage of the non-public network.

When the UE is in the coverage of a PLMN, according to certain embodiments, the UE's access attempt follows the UE configuration of the PLMN. The MNO may be able to control access attempts for the UE accessing to private slice of its PLMN whenever needed for PLMN service or Non-Public network service. The third party may be able to control access attempts for the UE accessing to a non-public network for using private slice of a PLMN for PLMN service.

Example Embodiment 4.1

Following embodiment 4, the MNO may coordinate the operator's defined access category definition between a UE's non-public network profile and a UE configuration in its PLMN. In this way, the UE configured with the non-public network profile can be applied to both cases when it accesses to the private slice in PLMN for non-public network service or it accesses to the non-public network.

Example Embodiment 4.2

Following embodiment 4.1, in certain embodiments, the MNO provides the third party with the following information: allocated private slice information per NPN-ID, e.g. S-NSSAI; its PLMN-ID; and/or operator defined access category definition including precedence, an operator-defined access category number, and/or an operator defined access criteria type value and operator defined access criteria type.

Example Embodiment 4.3

Following embodiment 4.1, in certain embodiments, the third party provides the MNO the following information: NPN-ID or list of NPN-IDs to be accessed from the allocated private slice in PLMN.

Example Embodiment 4.4

Following embodiment 4.3, in certain embodiments, the MNO may perform access control for the UE attempting to access a non-public network in a private slice in its PLMN as follows: the RAN broadcasts the operator's defined access category definition that includes S-NSSAI associated with NPN-ID; and the UE configured with S-NSSAI and associated NPN-ID in non-public network profile stops access attempting in private slice in the PLMN.

Example Embodiment 4.5

Following embodiment 4.2, in certain embodiments, the third party may perform access control for the UE attempting to access a non-public network to a PLMN via its non-public network as follows: the RAN node in the non-public network broadcasts the operator's defined access category definition that includes S-NSSAI associated with PLMN-ID; and the UE configured with S-NSSAI and associated PLMN-ID in non-public network profile stops access attempting.

Example Systems and Apparatuses

Figure 3:
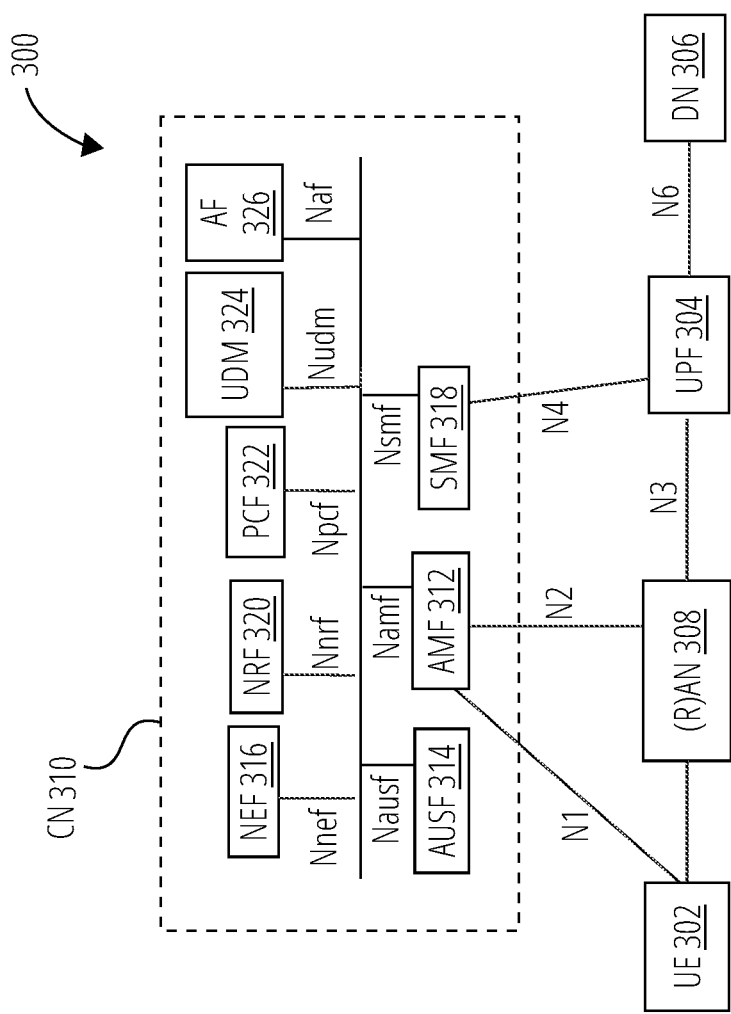
FIG. 3 illustrates a system in accordance with one embodiment.

FIG. 3 illustrates an architecture of a system 300 of a network in accordance with some embodiments. The system 300 is shown to include a UE 302; a 5G access node or RAN node (shown as (R)AN node 308); a User Plane Function (shown as UPF 304); a Data Network (DN 306), which may be, for example, operator services, Internet access or 3rd party services; and a 5G Core Network (5GC) (shown as CN 310).

The CN 310 may include an Authentication Server Function (AUSF 314); a Core Access and Mobility Management Function (AMF 312); a Session Management Function (SMF 318); a Network Exposure Function (NEF 316); a Policy Control Function (PCF 322); a Network Function (NF) Repository Function (NRF 320); a Unified Data Management (UDM 324); and an Application Function (AF 326). The CN 310 may also include other elements that are not shown, such as a Structured Data Storage network function (SDSF), an Unstructured Data Storage network function (UDSF), and the like.

The UPF 304 may act as an anchor point for intra-RAT and inter-RAT mobility, an external PDU session point of interconnect to DN 306, and a branching point to support multi-homed PDU session. The UPF 304 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 304 may include an uplink classifier to support routing traffic flows to a data network. The DN 306 may represent various network operator services, Internet access, or third party services.

The AUSF 314 may store data for authentication of UE 302 and handle authentication related functionality. The AUSF 314 may facilitate a common authentication framework for various access types.

The AMF 312 may be responsible for registration management (e.g., for registering UE 302, etc.), connection management, reachability management, mobility management, and lawful interception of AMF-related events, and access authentication and authorization. AMF 312 may provide transport for SM messages for the SMF 318, and act as a transparent proxy for routing SM messages. AMF 312 may also provide transport for short message service (SMS) messages between UE 302 and an SMS function (SMSF) (not shown by FIG. 3). AMF 312 may act as Security Anchor Function (SEA), which may include interaction with the AUSF 314 and the UE 302, receipt of an intermediate key that was established as a result of the UE 302 authentication process. Where USIM based authentication is used, the AMF 312 may retrieve the security material from the AUSF 314. AMF 312 may also include a Security Context Management (SCM) function, which receives a key from the SEA that it uses to derive access-network specific keys. Furthermore, AMF 312 may be a termination point of RAN CP interface (N2 reference point), a termination point of NAS (NI) signaling, and perform NAS ciphering and integrity protection.

AMF 312 may also support NAS signaling with a UE 302 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 302 and AMF 312, and relay uplink and downlink user-plane packets between the UE 302 and UPF 304. The N3IWF also provides mechanisms for IPsec tunnel establishment with the UE 302.

The SMF 318 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 318 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 316 may provide means for securely exposing the services and capabilities provided by 3GPP network functions for third party, internal exposure/re-exposure, Application Functions (e.g., AF 326), edge computing or fog computing systems, etc. In such embodiments, the NEF 316 may authenticate, authorize, and/or throttle the AFs. NEF 316 may also translate information exchanged with the AF 326 and information exchanged with internal network functions. For example, the NEF 316 may translate between an AF-Service-Identifier and an internal 5GC information. NEF 316 may also receive information from other network functions (NFs) based on exposed capabilities of other network functions. This information may be stored at the NEF 316 as structured data, or at a data storage NF using a standardized interfaces. The stored information can then be re-exposed by the NEF 316 to other NFs and AFs, and/or used for other purposes such as analytics.

The NRF 320 may support service discovery functions, receive NF Discovery Requests from NF instances, and provide the information of the discovered NF instances to the NF instances. NRF 320 also maintains information of available NF instances and their supported services.

The PCF 322 may provide policy rules to control plane function(s) to enforce them, and may also support unified policy framework to govern network behavior. The PCF 322 may also implement a front end (FE) to access subscription information relevant for policy decisions in a UDR of UDM 324.

The UDM 324 may handle subscription-related information to support the network entities' handling of communication sessions, and may store subscription data of UE 302. The UDM 324 may include two parts, an application FE and a User Data Repository (UDR). The UDM may include a UDM FE, which is in charge of processing of credentials, location management, subscription management, and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 322. UDM 324 may also support SMS management, wherein an SMS-FE implements the similar application logic as discussed previously.

The AF 326 may provide application influence on traffic routing, access to the Network Capability Exposure (NCE), and interact with the policy framework for policy control. The NCE may be a mechanism that allows the 5GC and AF 326 to provide information to each other via NEF 316, which may be used for edge computing implementations. In such implementations, the network operator and third party services may be hosted close to the UE 302 access point of attachment to achieve an efficient service delivery through the reduced end-to-end latency and load on the transport network. For edge computing implementations, the 5GC may select a UPF 304 close to the UE 302 and execute traffic steering from the UPF 304 to DN 306 via the N6 interface. This may be based on the UE subscription data, UE location, and information provided by the AF 326. In this way, the AF 326 may influence UPF (re)selection and traffic routing. Based on operator deployment, when AF 326 is considered to be a trusted entity, the network operator may permit AF 326 to interact directly with relevant NFs.

As discussed previously, the CN 310 may include an SMSF, which may be responsible for SMS subscription checking and verification, and relaying SM messages to/from the UE 302 to/from other entities, such as an SMS-GMSC/IWMSC/SMS-router. The SMS may also interact with AMF 312 and UDM 324 for notification procedure that the UE 302 is available for SMS transfer (e.g., set a UE not reachable flag, and notifying UDM 324 when UE 302 is available for SMS).

The system 300 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 300 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 310 may include an Nx interface, which is an inter-CN interface between the MME (e.g., MME(s) 614) and the AMF 312 in order to enable interworking between CN 310 and CN 606.

Although not shown by FIG. 3, the system 300 may include multiple RAN nodes (such as (R)AN node 308) wherein an Xn interface is defined between two or more (R)AN node 308 (e.g., gNBs and the like) connecting to a 5GC, between a (R)AN node 308 (e.g., gNB) connecting to CN 310 and an eNB, and/or between two eNBs connecting to CN 310.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 302 in a connected mode (e.g., CM-CONNECTED) including functionality to manage the UE mobility for connected mode between one or more (R)AN node 308. The mobility support may include context transfer from an old (source) serving (R)AN node 308 to new (target) serving (R)AN node 308; and control of user plane tunnels between old (source) serving (R)AN node 308 to new (target) serving (R)AN node 308.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 4:
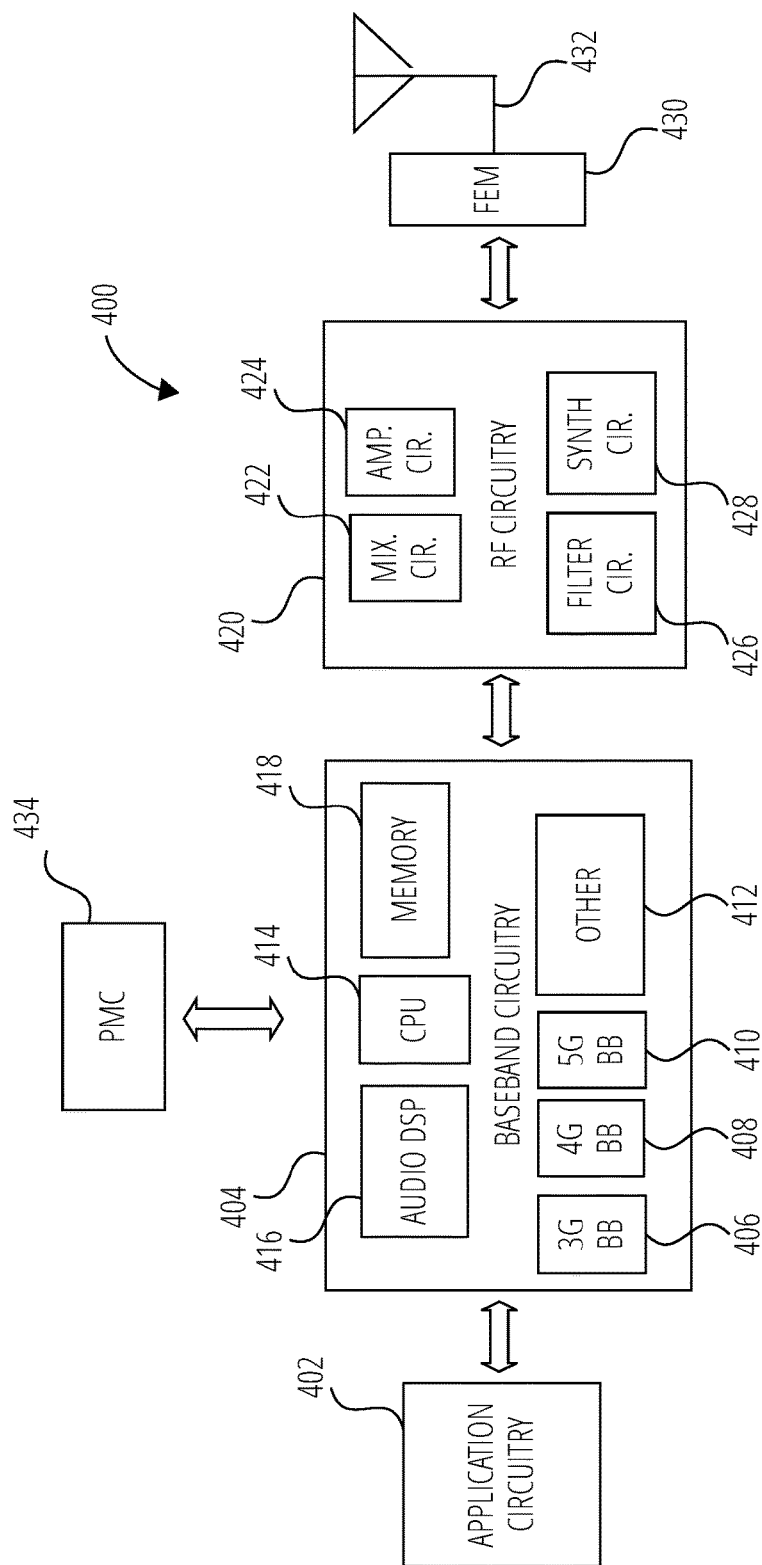
FIG. 4 illustrates a device in accordance with one embodiment.

FIG. 4 illustrates example components of a device 400 in accordance with some embodiments. In some embodiments, the device 400 may include application circuitry 402, baseband circuitry 404, Radio Frequency (RF) circuitry (shown as RF circuitry 420), front-end module (FEM) circuitry (shown as FEM circuitry 430), one or more antennas 432, and power management circuitry (PMC) (shown as PMC 434) coupled together at least as shown. The components of the illustrated device 400 may be included in a UE or a RAN node. In some embodiments, the device 400 may include fewer elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 420 and to generate baseband signals for a transmit signal path of the RF circuitry 420. The baseband circuitry 404 may interface with the application circuitry 402 for generation and processing of the baseband signals and for controlling operations of the RF circuitry 420. For example, in some embodiments, the baseband circuitry 404 may include a third generation (3G) baseband processor (3G baseband processor 406), a fourth generation (4G) baseband processor (4G baseband processor 408), a fifth generation (5G) baseband processor (5G baseband processor 410), or other baseband processor(s) 412 for other existing generations, generations in development or to be developed in the future (e.g., second generation (2G), sixth generation (6G), etc.). The baseband circuitry 404 (e.g., one or more of baseband processors) may handle various radio control functions that enable communication with one or more radio networks via the RF circuitry 420. In other embodiments, some or all of the functionality of the illustrated baseband processors may be included in modules stored in the memory 418 and executed via a Central Processing Unit (CPU 414). The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), preceding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include a digital signal processor (DSP), such as one or more audio DSP(s) 416. The one or more audio DSP(s) 416 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 404 is configured to support radio communications of more than one wireless protocol may be referred to as multi-mode baseband circuitry.

The RF circuitry 420 may enable communication with wireless networks using modulated electromagnetic radiation through a non-solid medium. In various embodiments, the RF circuitry 420 may include switches, filters, amplifiers, etc. to facilitate the communication with the wireless network. The RF circuitry 420 may include a receive signal path which may include circuitry to down-convert RF signals received from the FEM circuitry 430 and provide baseband signals to the baseband circuitry 404. The RF circuitry 420 may also include a transmit signal path which may include circuitry to up-convert baseband signals provided by the baseband circuitry 404 and provide RF output signals to the FEM circuitry 430 for transmission.

In some embodiments, the receive signal path of the RF circuitry 420 may include mixer circuitry 422, amplifier circuitry 424 and filter circuitry 426. In some embodiments, the transmit signal path of the RF circuitry 420 may include filter circuitry 426 and mixer circuitry 422. The RF circuitry 420 may also include synthesizer circuitry 428 for synthesizing a frequency for use by the mixer circuitry 422 of the receive signal path and the transmit signal path. In some embodiments, the mixer circuitry 422 of the receive signal path may be configured to down-convert RF signals received from the FEM circuitry 430 based on the synthesized frequency provided by synthesizer circuitry 428. The amplifier circuitry 424 may be configured to amplify the down-converted signals and the filter circuitry 426 may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, the mixer circuitry 422 of the receive signal path may comprise passive mixers, although the scope of the embodiments is not limited in this respect.

In some embodiments, the mixer circuitry 422 of the transmit signal path may be configured to up-convert input baseband signals based on the synthesized frequency provided by the synthesizer circuitry 428 to generate RF output signals for the FEM circuitry 430. The baseband signals may be provided by the baseband circuitry 404 and may be filtered by the filter circuitry 426.

In some embodiments, the mixer circuitry 422 of the receive signal path and the mixer circuitry 422 of the transmit signal path may include two or more mixers and may be arranged for quadrature downconversion and upconversion, respectively. In some embodiments, the mixer circuitry 422 of the receive signal path and the mixer circuitry 422 of the transmit signal path may include two or more mixers and may be arranged for image rejection (e.g., Hartley image rejection). In some embodiments, the mixer circuitry 422 of the receive signal path and the mixer circuitry 422 may be arranged for direct downconversion and direct upconversion, respectively. In some embodiments, the mixer circuitry 422 of the receive signal path and the mixer circuitry 422 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 420 may include analog-to-digital converter (ADC) and digital-to-analog converter (DAC) circuitry and the baseband circuitry 404 may include a digital baseband interface to communicate with the RF circuitry 420.

In some dual-mode embodiments, a separate radio IC circuitry may be provided for processing signals for each spectrum, although the scope of the embodiments is not limited in this respect.

In some embodiments, the synthesizer circuitry 428 may be a fractional-N synthesizer or a fractional N/N+1 synthesizer, although the scope of the embodiments is not limited in this respect as other types of frequency synthesizers may be suitable. For example, synthesizer circuitry 428 may be a delta-sigma synthesizer, a frequency multiplier, or a synthesizer comprising a phase-locked loop with a frequency divider.

The synthesizer circuitry 428 may be configured to synthesize an output frequency for use by the mixer circuitry 422 of the RF circuitry 420 based on a frequency input and a divider control input. In some embodiments, the synthesizer circuitry 428 may be a fractional N/N+1 synthesizer.

In some embodiments, frequency input may be provided by a voltage controlled oscillator (VCO), although that is not a requirement. Divider control input may be provided by either the baseband circuitry 404 or the application circuitry 402 (such as an applications processor) depending on the desired output frequency. In some embodiments, a divider control input (e.g., N) may be determined from a look-up table based on a channel indicated by the application circuitry 402.

Synthesizer circuitry 428 of the RF circuitry 420 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 428 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 420 may include an IQ/polar converter.

The FEM circuitry 430 may include a receive signal path which may include circuitry configured to operate on RF signals received from one or more antennas 432, amplify the received signals and provide the amplified versions of the received signals to the RF circuitry 420 for further processing. The FEM circuitry 430 may also include a transmit signal path which may include circuitry configured to amplify signals for transmission provided by the RF circuitry 420 for transmission by one or more of the one or more antennas 432. In various embodiments, the amplification through the transmit or receive signal paths may be done solely in the RF circuitry 420, solely in the FEM circuitry 430, or in both the RF circuitry 420 and the FEM circuitry 430.

In some embodiments, the FEM circuitry 430 may include a TX/RX switch to switch between transmit mode and receive mode operation. The FEM circuitry 430 may include a receive signal path and a transmit signal path. The receive signal path of the FEM circuitry 430 may include an LNA to amplify received RF signals and provide the amplified received RF signals as an output (e.g., to the RF circuitry 420). The transmit signal path of the FEM circuitry 430 may include a power amplifier (PA) to amplify input RF signals (e.g., provided by the RF circuitry 420), and one or more filters to generate RF signals for subsequent transmission (e.g., by one or more of the one or more antennas 432).

In some embodiments, the PMC 434 may manage power provided to the baseband circuitry 404. In particular, the PMC 434 may control power-source selection, voltage scaling, battery charging, or DC-to-DC conversion. The PMC 434 may often be included when the device 400 is capable of being powered by a battery, for example, when the device 400 is included in a UE. The PMC 434 may increase the power conversion efficiency while providing desirable implementation size and heat dissipation characteristics.

FIG. 4 shows the PMC 434 coupled only with the baseband circuitry 404. However, in other embodiments, the PMC 434 may be additionally or alternatively coupled with, and perform similar power management operations for, other components such as, but not limited to, the application circuitry 402, the RF circuitry 420, or the FEM circuitry 430.

In some embodiments, the PMC 434 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used to execute Layer 3, Layer 2, or Layer 1 functionality, while processors of the application circuitry 402 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
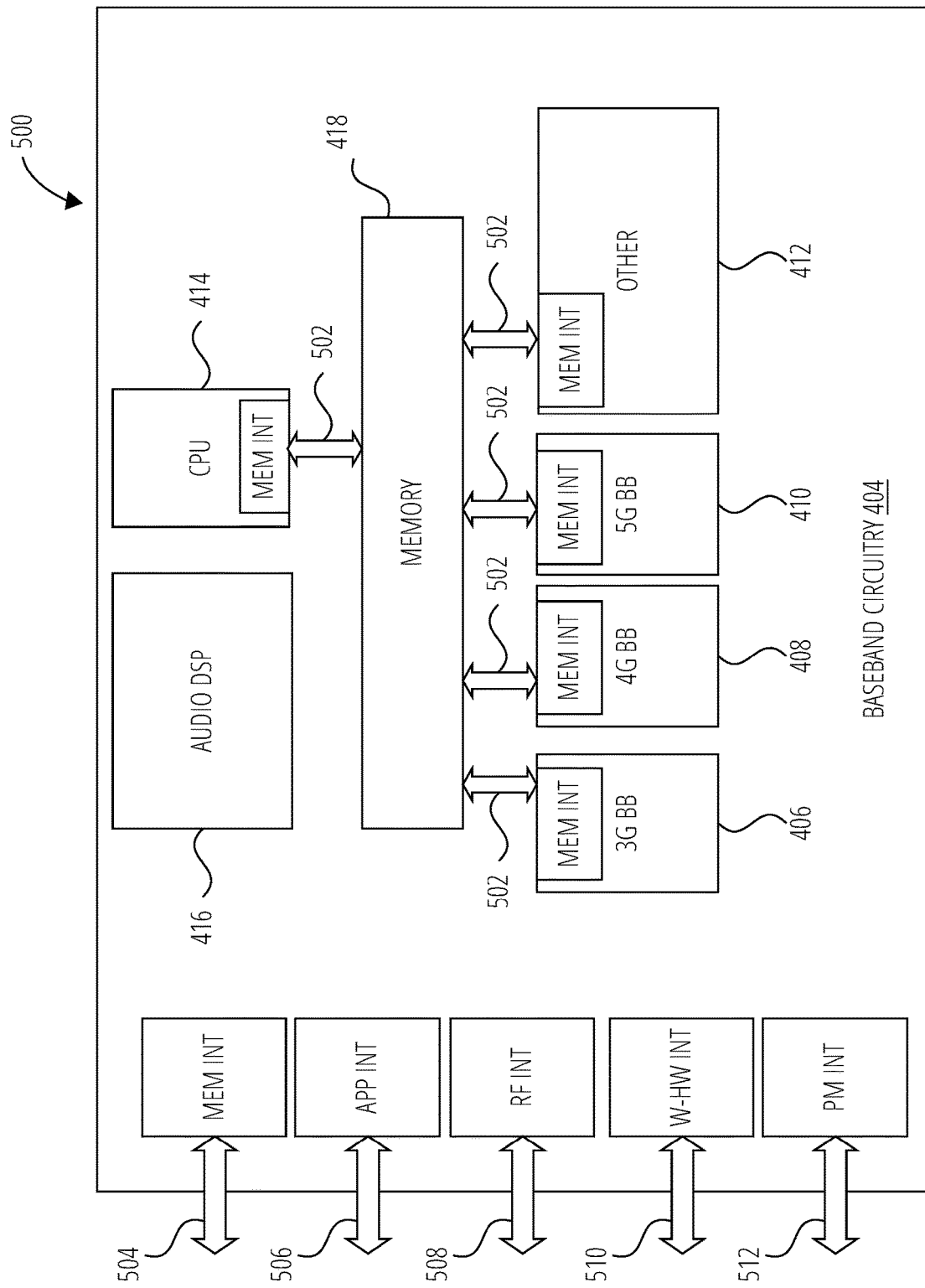
FIG. 5 illustrates example interfaces in accordance with one embodiment.

FIG. 5 illustrates example interfaces 500 of baseband circuitry in accordance with some embodiments. As discussed above, the baseband circuitry 404 of FIG. 4 may comprise 3G baseband processor 406, 4G baseband processor 408, 5G baseband processor 410, other baseband processor(s) 412, CPU 414, and a memory 418 utilized by said processors. As illustrated, each of the processors may include a respective memory interface 502 to send/receive data to/from the memory 418.

The baseband circuitry 404 may further include one or more interfaces to communicatively couple to other circuitries/devices, such as a memory interface 504 (e.g., an interface to send/receive data to/from memory external to the baseband circuitry 404), an application circuitry interface 506 (e.g., an interface to send/receive data to/from the application circuitry 402 of FIG. 4), an RF circuitry interface 508 (e.g., an interface to send/receive data to/from RF circuitry 420 of FIG. 4), a wireless hardware connectivity interface 510 (e.g., an interface to send/receive data to/from Near Field Communication (NFC) components, Bluetooth® components (e.g., Bluetooth® Low Energy), Wi-Fi® components, and other communication components), and a power management interface 512 (e.g., an interface to send/receive power or control signals to/from the PMC 434.

Figure 6:
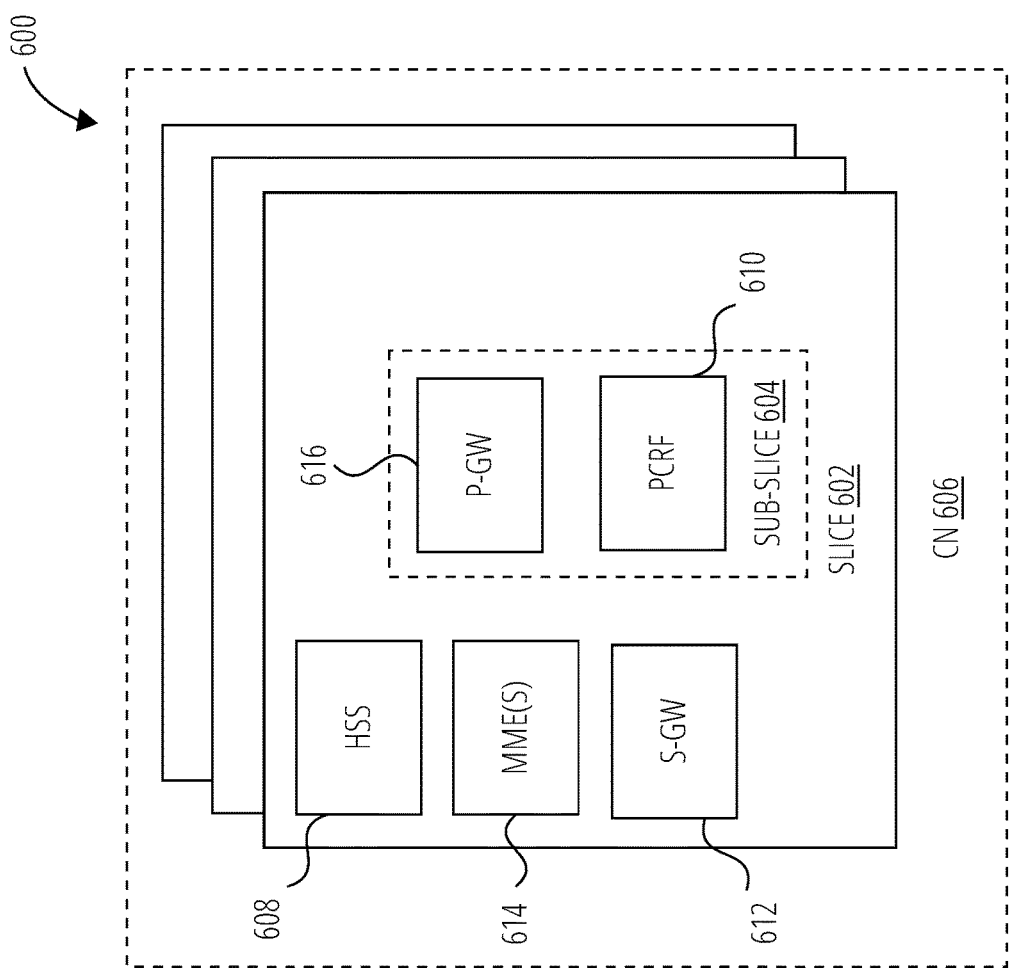
FIG. 6 illustrates components in accordance with one embodiment.

FIG. 6 illustrates components 600 of a core network in accordance with some embodiments. The components of the CN 606 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 606 may be referred to as a network slice 602 (e.g., the network slice 602 is shown to include the HSS 608, the MME(s) 614, and the S-GW 612). A logical instantiation of a portion of the CN 606 may be referred to as a network sub-slice 604 (e.g., the network sub-slice 604 is shown to include the P-GW 616 and the PCRF 610).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 7:
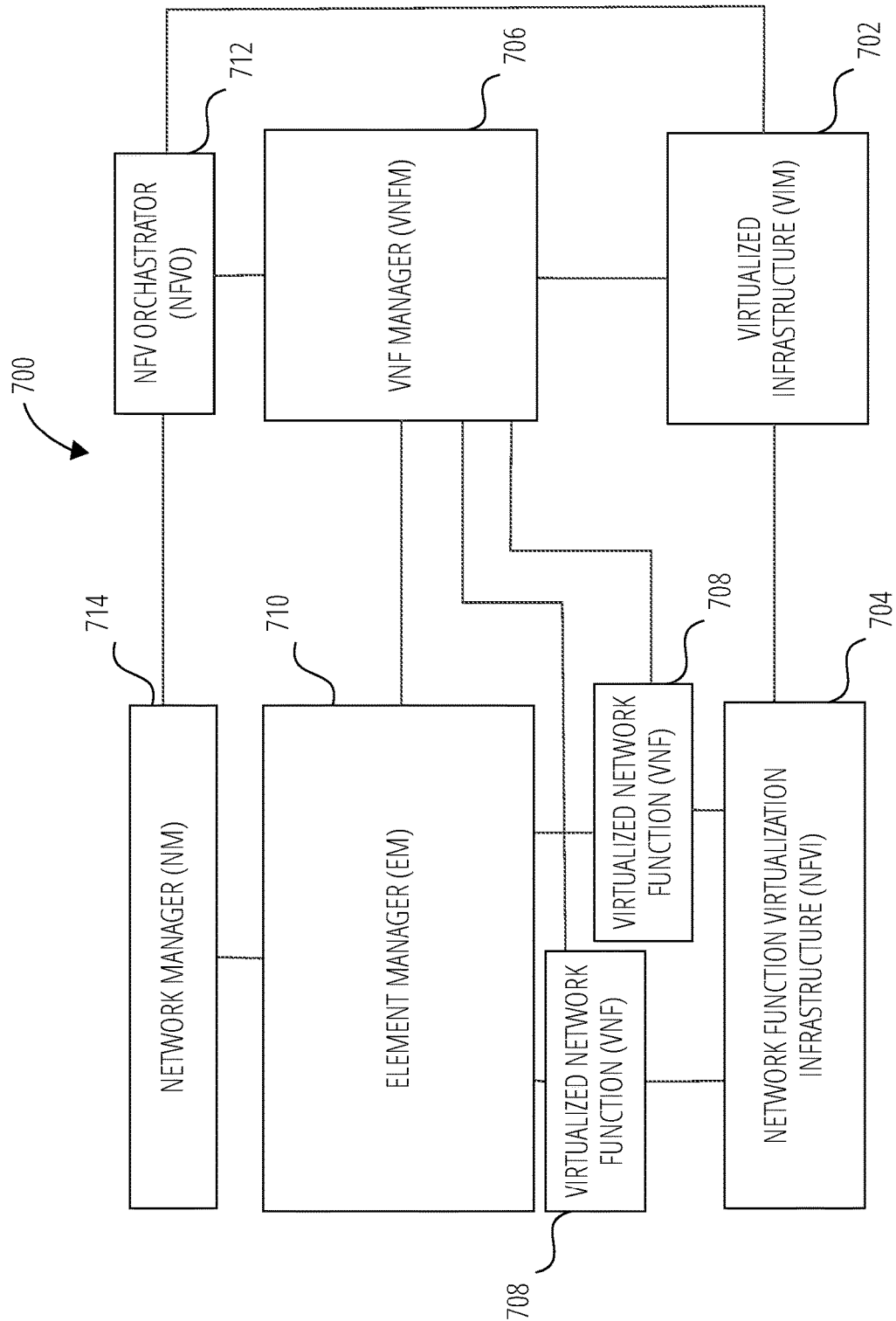
FIG. 7 illustrates a system in accordance with one embodiment.

FIG. 7 is a block diagram illustrating components, according to some example embodiments, of a system 700 to support NFV. The system 700 is illustrated as including a virtualized infrastructure manager (shown as VIM 702), a network function virtualization infrastructure (shown as NFVI 704), a VNF manager (shown as VNFM 706), virtualized network functions (shown as VNF 708), an element manager (shown as EM 710), an NFV Orchestrator (shown as NFVO 712), and a network manager (shown as NM 714).

The VIM 702 manages the resources of the NFVI 704. The NFVI 704 can include physical or virtual resources and applications (including hypervisors) used to execute the system 700. The VIM 702 may manage the life cycle of virtual resources with the NFVI 704 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 706 may manage the VNF 708. The VNF 708 may be used to execute EPC components/functions. The VNFM 706 may manage the life cycle of the VNF 708 and track performance, fault and security of the virtual aspects of VNF 708. The EM 710 may track the performance, fault and security of the functional aspects of VNF 708. The tracking data from the VNFM 706 and the EM 710 may comprise, for example, performance measurement (PM) data used by the VIM 702 or the NFVI 704. Both the VNFM 706 and the EM 710 can scale up/down the quantity of VNFs of the system 700.

The NFVO 712 may coordinate, authorize, release and engage resources of the NFVI 704 in order to provide the requested service (e.g., to execute an EPC function, component, or slice). The NM 714 may provide a package of end-user functions with the responsibility for the management of a network, which may include network elements with VNFs, non-virtualized network functions, or both (management of the VNFs may occur via the EM 710).

Figure 8:
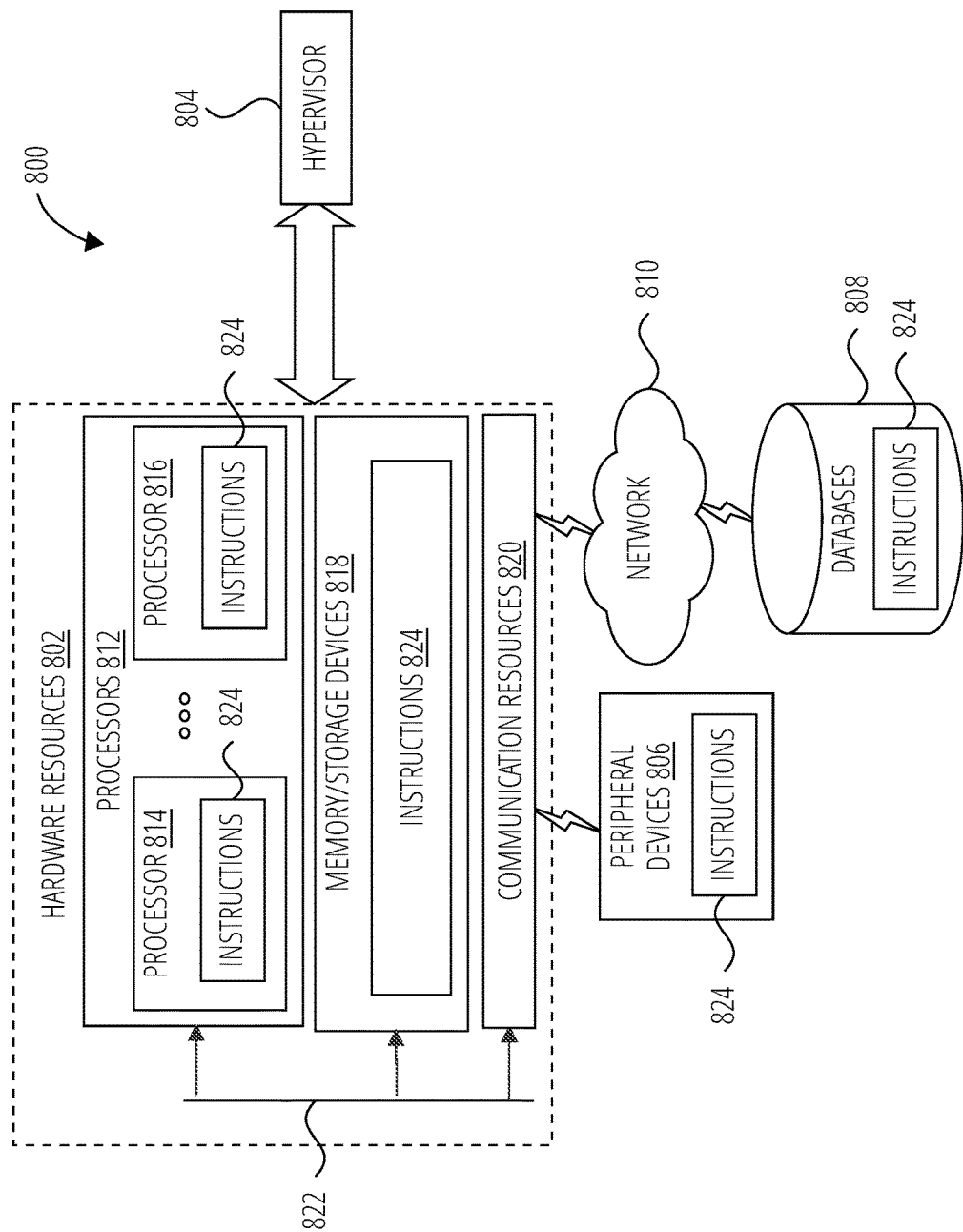
FIG. 8 illustrates components in accordance with one embodiment.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 812 (or processor cores), one or more memory/storage devices 818, and one or more communication resources 820, each of which may be communicatively coupled via a bus 822. For embodiments where node virtualization (e.g., NFV) is utilized, a hypervisor 804 may be executed to provide an execution environment for one or more network slices/sub-slices to utilize the hardware resources 802.

The processors 812 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 814 and a processor 816.

The memory/storage devices 818 may include main memory, disk storage, or any suitable combination thereof. The memory/storage devices 818 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 820 may include interconnection or network interface components or other suitable devices to communicate with one or more peripheral devices 806 or one or more databases 808 via a network 810. For example, the communication resources 820 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 824 may comprise software, a program, an application, an applet, an app, or other executable code for causing at least any of the processors 812 to perform any one or more of the methodologies discussed herein. The instructions 824 may reside, completely or partially, within at least one of the processors 812 (e.g., within the processor's cache memory), the memory/storage devices 818, or any suitable combination thereof. Furthermore, any portion of the instructions 824 may be transferred to the hardware resources 802 from any combination of the peripheral devices 806 or the databases 808. Accordingly, the memory of the processors 812, the memory/storage devices 818, the peripheral devices 806, and the databases 808 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a computer-readable storage medium including instructions that when executed by a processor of a third party network configured to deploy radio access network (RAN) and core network (CN) infrastructure, cause the processor to: operate the third party network as a communication service provider (CSP) for a network slice (CSP-NS) in a public land mobile network (PLMN) operated by a mobile network operator (MNO); for one or more user equipment (UEs) configured as communication service consumers, operate the third party network as a CSP for the one or more UEs (CSP-UE); and provision a non-public network (NPN) profile for the one or more UEs, the NPN profile comprising an operator defined access category definition including at least one access category criteria type to bar specific access attempts by the one or more UEs.

Example 2 includes the computer-readable storage medium of Example 1, wherein the at least one access category criteria type of the operator defined access category definition is selected from a group comprising: a PLMN identifier (PLMN-ID) or a list of PLMN-IDs; a single network slice selection assistance information (S-NSSAI) or a list of S-NSSAIs per PLMN-ID; and an NPN identifier (NPN-ID) or a list of NPN-IDs per PLMN-ID.

Example 3 includes the computer-readable storage medium of Example 2, wherein the NPN profile further comprises: a PLMN PLMN-ID or a list of PLMN-IDs to identify one or more PLMNs associated with a private slice and an NPN; an NPN-ID to identify the NPN as authorized to use the private slice associated with the PLMN-ID or the list of PLMN-IDs; and a private slice single network slice selection assistance information (S-NSSAI) or a list of private slice S-NSSAIs per PLMN-ID to indicate one or more authorized private slices in the PLMN-ID or the list of PLMN-IDs operated as non-public networks.

Example 4 includes the computer-readable storage medium of Example 2, wherein the instructions further cause the processor to broadcast, through a RAN node in a private slice in the PLMN, the operator defined access category definition including the at least one access category criteria type to bar the specific access attempts by the one or more UEs.

Example 5 includes the computer-readable storage medium of Example 1, wherein the instructions further cause the processor to provision the NPN profile using a UE configuration update procedure.

Example 6 is a computer-readable storage medium including instructions that when executed by a processor, cause the processor to: generate a non-public network identifier (NPN-ID) to identify a non-public network (NPN) configured to provide services to one or more user equipments (UEs); generate an access category definition provided by an operator of the NPN, the access category definition comprising access baring parameters to bar specific access attempts from the one or more UEs configured with the access baring parameters; and broadcast information, from a radio access network (RAN) node of the NPN, comprising the NPN-ID and the access category definition comprising the access baring parameters.

Example 7 includes the computer-readable storage medium of Example 6, wherein the access category definition comprises an access category type comprising one or more of: the NPN-ID or a list of NPN-IDs; a single network slice selection assistance information (S-NSSAI) or a list of S-NSSAIs; and a service provider identifier (SP-ID) or a list of SP-IDs corresponding to services provided through the NPN by at least one of a mobile network operator (MNO) and a third party service network.

Example 8 includes the computer-readable storage medium of Example 7, wherein the access baring parameters comprise a combination of one or more of the NPN-ID or the list of NPN-IDs, the S-NSSAI or the list of S-NSSAIs, and the SP-ID) or the list of SP-IDs, and wherein the combination is to bar the specific access attempts from the one or more UEs configured with the same combination.

Example 9 includes the computer-readable storage medium of Example 6, wherein to broadcast the information comprises to include the information in a system information block (SIB).

Example 10 is a method for a mobile network operator (MNO). The method includes: configuring the MNO as a communication service provider (CSP) for one or more user equipments (UEs); and performing a UE configuration update procedure to provision parameters for a public land mobile network (PLMN) to the one or more UEs. The parameters include: a non-public network (NPN) identifier (NPN-ID) or a list of NPN-IDs to identify an authorized NPN for using a private slice in the PLMN; a private slice single network slice selection assistance information (S-NSSAI) or a list of private slice S-NSSAIs per NPN-ID to indicate the private slice to use as the authorized NPN identified by the NPN-ID; and an operator defined access category definition including at least one of the S-NSSAI or the list of S-NSSAIs, and the NPN-ID.

Example 11 includes the method of Example 10, wherein the operator defined access category definition is provided per S-NSSAI and per NPN-ID.

Example 12 includes the method of Example 10, further comprising broadcasting, through a radio access network (RAN) node in the private slice in the PLMN, the operator defined access category definition including access baring information to bar specific access attempts by the one or more UEs.

Example 13 includes the method of Example 10, further comprising provisioning the parameters using the UE configuration update procedure.

Example 14 is a method for a third party network configured to deploy radio access network (RAN) node and core network (CN) infrastructure. The method includes: providing an application programming interface (API) to exchange information over an interface between a first virtual network function provided by a mobile network operator (MNO) and a second virtual network function provided by the third party network; and receiving, through the API from the MNO, a single network slice selection assistance information (S-NSSAI) configuration of the MNO and an operator defined access category.

Example 15 includes the method of Example 14, further comprising using the API to request the S-NSSAI configuration and the operator defined access category from the MNO.

Example 16 includes the method of Example 14, wherein the API is configured to allow the MNO to trigger a user equipment (UE) configuration procedure for configuring a UE to access a private slice in a public land mobile network (PLMN).

Example 17 includes the method of Example 14, further comprising: receiving, through the API from the MNO, spectrum information and corresponding radio network configuration information; and using the spectrum information and the corresponding radio network configuration information to configure the RAN node and the CN infrastructure.

Example 18 includes the method of Example 14, further comprising using the API to provide data to the MNO selected from a group comprising: radio resource information for network slices associated to a public land mobile network (PLMN) of the MNO, an operator defined access category definition of the third party for a private slice in a non-public network, and an authorization and request for the MNO to manage access control configuration for the RAN node deployed by the third party.

Example 19 is an apparatus for a mobile network operator (MNO). The apparatus includes a memory interface and a processor. The memory interface is to send or receive, to or from a memory device, data to configure a user equipment (UE) with a UE configuration of a public land mobile network (PLMN) of the MNO. The processor is to: coordinate an operator defined access category definition between a non-public network profile of the UE and the UE configuration of the PLMN of the MNO; and control access attempts by the UE to access a private slice in the PLMN.

Example 20 includes the apparatus of Example 19, wherein the processor is further configured to provide a third party network with allocated private slice information per non-public network identifier (NPN-ID), a PLMN identifier (PLMN-ID) of the PLMN, and an operator defined access definition including a precedence, an operator-defined access category number, an operator defined access criteria type value, and an operator defined access criteria type.

Example 21 includes the apparatus of Example 20, wherein the processor is further configured to provide the third party network with a single network slice selection assistance information (S-NSSAI) associated with the NPN-ID.

Example 22 includes the apparatus of Example 19, wherein the processor is further configured to process information received from a third party network, the information comprising a non-public network identifier (NPN-ID) or a list of NPN-IDs to be accessed from an allocated private slice in the PLMN.

Example 23 includes the apparatus of Example 19, wherein the processor is further configured to allow the third party network to control access attempts for the UE accessing to a non-public network for using the private slice of the PLMN for a PLMN service.

Example 24 includes the apparatus of Example 19, wherein the processor is further configured to perform access control for the UE attempting to access a non-public network via the private slice in the PLMN by configuring a radio access network (RAN) node in the PLMN to broadcast the operator defined access category definition, the operator defined access category definition comprising a single network slice selection assistance information (S-NSSAI) associated with a non-public network identifier (NPN-ID).

Example 25 includes the apparatus of Example 24, wherein if the UE is configured with the S-NSSAI and the associated NPN-ID, the UE stops attempting to access the private slice in the PLMN.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for a mobile network operator (MNO), the apparatus comprising:
 a memory interface to send or receive, to or from a memory device, data to configure a user equipment (UE) with a UE configuration of a public land mobile network (PLMN) of the MNO; and
 a processor to:
  coordinate an operator defined access category definition between a non-public network profile of the UE and the UE configuration of the PLMN of the MNO;
  control access attempts by the UE to access a private slice in the PLMN;
  allow a third party network to control access attempts for the UE accessing to a non-public network for using the private slice in the PLMN for a PLMN service; and
  provide the third party network with allocated private slice information per non-public network identifier (NPN-ID), a PLMN identifier (PLMN-ID) of the PLMN, and an operator defined access definition including a precedence, an operator-defined access category number, an operator defined access criteria type value, and an operator defined access criteria type.

2. The apparatus of claim 1, wherein the processor is further configured to provide the third party network with a single network slice selection assistance information (S-NSSAI) associated with the NPN-ID.

3. The apparatus of claim 1, wherein the processor is further configured to process information received from the third party network, the information comprising the NPN-ID or a list of NPN-IDs to be accessed from an allocated private slice in the PLMN.

4. The apparatus of claim 1, wherein the processor is further configured to perform access control for the UE attempting to access the non-public network via the private slice in the PLMN by configuring a radio access network (RAN) node in the PLMN to broadcast the operator defined access category definition, the operator defined access category definition comprising a single network slice selection assistance information (S-NSSAI) associated with the NPN-ID.

5. The apparatus of claim 4, wherein if the UE is configured with the S-NSSAI and the associated NPN-ID, the UE stops attempting to access the private slice in the PLMN.

6. A method for a mobile network operator (MNO), the method comprising:
 coordinating an operator defined access category definition between a non-public network profile of a user equipment (UE) and a UE configuration of a public land mobile network (PLMN) of the MNO;
 controlling access attempts by the UE to access a private slice in the PLMN;
 allowing a third party network to control access attempts for the UE accessing to non-public network for using the private slice in the PLMN for a PLMN service; and
 providing the third party network with allocated private slice information per non-public network identifier (NPN-ID), a PLMN identifier (PLMN-ID) of the PLMN, and an operator defined access definition including a precedence, an operator-defined access category number, an operator defined access criteria type value, and an operator defined access criteria type.

7. The method of claim 6, further comprising providing the third party network with a single network slice selection assistance information (S-NSSAI) associated with the NPN-ID.

8. The method of claim 6, further comprising processing information received from the third party network, the information comprising the NPN-ID or a list of NPN-IDs to be accessed from an allocated private slice in the PLMN.

9. The method of claim 6, further comprising performing access control for the UE attempting to access the non-public network via the private slice in the PLMN by configuring a radio access network (RAN) node in the PLMN to broadcast the operator defined access category definition, the operator defined access category definition comprising a single network slice selection assistance information (S-NSSAI) associated with the NPN-ID.

10. The method of claim 9, wherein if the UE is configured with the S-NSSAI and the associated NPN-ID, the UE stops attempting to access the private slice in the PLMN.

* * * * *